(12) United States Patent
Noguchi et al.

(10) Patent No.: US 7,092,210 B2
(45) Date of Patent: Aug. 15, 2006

(54) MAGNETIC RECORDING AND REPRODUCTION METHOD

(75) Inventors: Hitoshi Noguchi, Kanagawa (JP); Ayako Matsumoto, Kanagawa (JP); Shinji Saito, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/890,090

(22) Filed: Jul. 14, 2004

(65) Prior Publication Data

US 2005/0013046 A1  Jan. 20, 2005

(30) Foreign Application Priority Data

Jul. 14, 2003  (JP)  ............ P.2003-274091

(51) Int. Cl.
*G11B 5/82* (2006.01)

(52) U.S. Cl. ............ 360/135; 360/55; 360/235.2; 360/235.3; 360/59; 428/831.2

(58) Field of Classification Search ............ None
See application file for complete search history.

(56) References Cited

U.S. PATENT DOCUMENTS

| | | | | |
|---|---|---|---|---|
| 5,838,516 A * | 11/1998 | Staggers et al. | ......... | 360/98.08 |
| 5,935,674 A * | 8/1999 | Saito et al. | ............ | 428/847.3 |
| 5,949,612 A * | 9/1999 | Gudeman et al. | ........ | 360/97.01 |
| 6,017,605 A * | 1/2000 | Yamazaki et al. | ........... | 428/842 |
| 6,061,215 A * | 5/2000 | Tomita | ................. | 360/133 |
| 6,303,205 B1 * | 10/2001 | Tanaka et al. | ........... | 428/848.1 |
| 6,445,544 B1 * | 9/2002 | Kohira et al. | ................ | 360/245 |
| 6,509,111 B1 * | 1/2003 | Shoda et al. | ................. | 428/831 |
| 6,556,381 B1 * | 4/2003 | Kohira et al. | ............ | 360/236.3 |
| 6,661,606 B1 * | 12/2003 | Sano et al. | .................. | 360/126 |
| 6,706,427 B1 * | 3/2004 | Yokoyama et al. | ...... | 428/846.9 |
| 6,760,193 B1 * | 7/2004 | Kohira et al. | ............ | 360/236.3 |
| 6,791,803 B1 * | 9/2004 | Saito et al. | ................. | 428/829 |
| 6,852,432 B1 * | 2/2005 | Shoda et al. | ............. | 428/831.2 |
| 6,875,495 B1 * | 4/2005 | Harasawa et al. | ....... | 428/845.1 |
| 7,006,335 B1 * | 2/2006 | Kuwajima et al. | ....... | 360/294.4 |
| 2002/0045069 A1 * | 4/2002 | Shinohara et al. | ..... | 428/694 TS |

FOREIGN PATENT DOCUMENTS

| | | |
|---|---|---|
| JP | 2002-74649 A | 3/2002 |
| JP | 2003-16638 A | 1/2003 |

* cited by examiner

*Primary Examiner*—Wayne Young
*Assistant Examiner*—Dismery Mercedes
(74) *Attorney, Agent, or Firm*—Sughrue Mion, PLLC

(57) ABSTRACT

A magnetic recording and reproduction method comprising recording or reproducing a track of a rotating magnetic disk by means of a magnetic head, wherein the magnetic disk comprises a support and a magnetic layer containing ferromagnetic powder and a binder; the track has a breadth of 2 μm or less; and a frictional force between the magnetic layer and the magnetic head at innermost peripheral area of a recording region of the magnetic disk is 30 mN or less, a frictional force between the magnetic layer and a magnetic head at outermost peripheral area of a recording region of the magnetic disk is 20 mN or less, and a ratio of the frictional force at the innermost peripheral area to the frictional force at the outermost peripheral area is from 1.0 to 4.0.

10 Claims, No Drawings

MAGNETIC RECORDING AND REPRODUCTION METHOD

FIELD OF THE INVENTION

The present invention relates to a magnetic disc, in particular a magnetic disc using an Anisotropic Magnetoresistive (AMR) HEAD.

BACKGROUND OF THE INVENTION

As recording media for recording data of, e.g., personal computers, 2HD flexible discs (hereinafter referred to as "2HD-FD"), which are flexible magnetic discs, are now widely used, and a disc drive for 2HD-FD is carried in many personal computers as a standardized equipment. However, in recent years, the amount of data to be dealt with greatly increases, and the recording capacity of 2HD-FD is no longer sufficient in many cases. Accordingly, the increase in capacity of a flexible magnetic disc capable of easily handling is desired.

To meet the requirement, various techniques for the purpose of increasing the recording capacity of magnetic recording media have been developed and flexible magnetic discs far exceeding the recording capacity of 2HD-FD, e.g., magnetic discs having a recording capacity of 100 MB or higher, have been put to practical use. To cope with high density recording of data and data transfer at a high speed, recording and reproduction of these high capacity magnetic discs are performed with a magnetic disc apparatus using a magnetic head.

As is already known, there are cases where very important data (information) are recorded on magnetic discs, and recording and reproduction of data are generally performed repeatedly. Accordingly, it is of course required of high capacity magnetic discs to have excellent durability. Further, in recording and reproducing data, the load applied to the magnetic head of a magnetic recording apparatus is preferably smaller. For these requirements, coming of a magnetic disc having more excellent characteristics is required.

When a magnetic disc is revolved at a high speed and a magnetic head is run for seeking the surface of the disc for the prescribed time (e.g., from 200 to 300 hours in high temperature environment), there is a case where the magnetic disc takes a scratch and data cannot be recorded or reproduced, which leads to the occurrence of an error. One cause of the occurrence of scratches on a magnetic disc is the evaporation of a lubricant due to running and the reduction of a lubricating function.

It is disclosed in JP-A-2002-74649 (The term "JP-A" as used herein refers to an "unexamined published Japanese patent application".) that in the magnetic disc disclosed in the patent comprising a magnetic layer having provided on an intermediate layer, an appropriate amount of alkylamine lubricant is supplied to the surface of the magnetic disc without being adsorbed onto the nonmagnetic powder contained in the intermediate layer, so that the reduction of a friction coefficient can be realized without deteriorating electromagnetic characteristics and excellent reliability of the magnetic disc can be ensured.

Further, it is shown in EXAMPLES of JP-A-2003-16638 that the durability of a medium can be improved by reducing the frictional force applied to a magnetic head. However, it is known that a frictional force increases when the relative velocity between a head and a medium lowers, so that it is necessary to secure proper frictional characteristics in a wide range of relative velocity for ensuring stable frictional characteristics from the inside diameter to the outside diameter of a magnetic disc. Further, it has been known that when the value of frictional force is greatly different at the radius position, the attitude of a head changes, the spacing loss between a head and a disc becomes great and electromagnetic characteristics lower. This tendency is conspicuous when recording density is high, so that the improvement of durability was out of the question in the recording/reproducing system as attained in JP-A-2003-16638 having a track breadth in reproduction of 5 µm or more.

SUMMARY OF THE INVENTION

An object of the present invention is to provide a magnetic disc for high density recording capable of obtaining stable SNR throughout the recording area and excellent in running durability.

The above object of the invention can be solved by the following means.

(1) A magnetic recording and reproduction method comprising recording or reproducing a predetermined track of a rotating magnetic disk by means of a magnetic head, wherein the magnetic disk comprises a support and a magnetic layer containing ferromagnetic powder and a binder; the track has a breadth of 2 µm or less; and a frictional force between the magnetic layer and the magnetic head at innermost peripheral area of a recording region of the magnetic disk is 30 mN or less, a frictional force between the magnetic layer and a magnetic head at outermost peripheral area of a recording region of the magnetic disk is 20 mN or less, and a ratio of the frictional force at the innermost peripheral area to the frictional force at the outermost peripheral area is from 1.0 to 4.0.

(2) The method according to the item (1) above, wherein the frictional force at the innermost peripheral area is 20 mN or less, the frictional force at the outermost peripheral area is 10 mN or less, and the ratio of the frictional force at the innermost peripheral area to the frictional force at the outermost peripheral area is from 1.0 to 2.0.

(3) The method according to the item (1) above, wherein the ferromagnetic powder is hexagonal ferrite powder.

(4) The method according to the item (1) above, wherein the magnetic head is an Anisotropic Magnetoresistive (AMR) Head.

(5) The method according to the item (1) above, wherein the magnetic disk rotates at 1,800 rpm or more.

(6) The method according to the item (1) above, wherein the magnetic disk rotates at 7,800 rpm or less.

(7) The method according to the item (1) above, wherein the magnetic disk further comprises a lower layer so that the support, the lower layer and the magnetic layer are in this order, wherein the lower layer contains nonmagnetic powder and a binder.

(8) The method according to the item (1) above, wherein the magnetic disk comprises two magnetic layers, so that one of the two magnetic layers, the support, and other of the two magnetic layers are in this order.

(9) The method according to the item (1) above, wherein the magnetic layer contains a higher fatty acid ester and a long chain fatty acid.

(10) The method according to the item (1) above, wherein the magnetic layer further contains diamond particles as an abrasive.

The durability of a medium in the invention can be greatly improved by making the frictional force applied to a head at the innermost diameter to the outermost diameter low, and at the same time high SNR can be obtained throughout the inner periphery and the outer periphery even with a high track density of a track breadth of 2 μm or less by controlling the ratio of frictional force applied to a head at the innermost periphery and the outermost periphery.

DETAILED DESCRIPTION OF THE INVENTION

In a magnetic disc used in recording/reproducing system using a track breadth at the time of reproduction of 2 μm or less, the invention restricts the frictional forces (F) between a magnetic layer and a magnetic head, i.e., the frictional force at the innermost peripheral area of a recording region (Fin) to 30 mN or less, the frictional force at the outermost peripheral area of a recording region (Fout) to 20 mN or less, and the value of Fin/Fout to 1.0 to 4.0.

By the restriction of the frictional forces as above, the present invention can provide a magnetic disc capable of high density recording, showing SNR stable throughout the recording region, and excellent in running durability.

Frictional force (Fin) is a frictional force that can be obtained by rotating a magnetic disc, arranging a magnetic head in the rotary tangential direction of the magnetic disc and at the innermost peripheral part of a recording region, and detecting the force applied to the magnetic head with a micro load cell. Frictional force (Fin) is restricted to 30 mN or less, preferably 20 mN or less.

Frictional force (Fout) is a frictional force obtained by the same manner as in frictional force (Fin) except that a magnetic head is arranged at the outermost peripheral part of a recording region. Frictional force (Fout) is restricted to 20 mN or less, preferably 10 mN or less.

The rotary speed of a magnetic disc in measuring the frictional forces is not particularly restricted so long as the speed is within the range of the ordinary speed in the magnetic disc apparatus where the magnetic disc is used, is preferably 1,800 rpm or more, is preferably 7,800 rpm or less, and more preferably from 1,800 to 7,200 rpm.

Fin/Fout is from 1.0 to 4.0, preferably from 1.0 to 2.0.

The frictional forces in the invention are values which are satisfied in every environment of 23° C. 50% RH.

The measuring methods of the frictional forces are disclosed in detail in JP-A-2003-16638 and others.

A magnetic head for use in the present invention is a thin-film head including an AMR element. The head part of the magnetic head is brought upon the surface of a magnetic disc with a weak force by spring force such as gimbal, and at the same time flies by the air current caused by high rotation of the magnetic disc to maintain a slight clearance between. The head is completely flying at the front rotating part of the head, the flying amount at the rear end is smaller and the head comes in contact with the disc sometimes. Accordingly, frictional force (F) is caused between the magnetic disc surface and the magnetic head.

It is presumed that the magnitude of frictional force (F) varies by the surface states of a magnetic disc, e.g., the unevenness and the hardness of the surface of a magnetic disc. The smaller the frictional force, the lower is the probability of the damage of a magnetic disc surface and a magnetic head.

In the invention, as described above, electromagnetic characteristics can be reconciled with running durability by controlling frictional force (Fin), frictional force (Fout) and Fin/Fout.

A magnetic disc in the present invention can maintain a lubricating function in long time use, has high durability and excellent magnetic characteristics. When a frictional force increases, there are cases where a tracking error is liable to occur and data cannot be recorded or reproduced, but these drawbacks can be improved by suppressing a frictional force and the reliability of a magnetic disc can be increased.

A magnetic disc in the invention is controlled of the surface states such as the unevenness and hardness of the surface and lubricant so that the prescribed frictional force (Fin), frictional force (Fout) and Fin/Fout can be obtained.

As the means for controlling the surface states of a magnetic disc, the selection of the binders contained in a magnetic layer (Tg, physical strength and the like), the selection of powders (the structures, configurations and sizes of magnetic powders, abrasives, carbon blacks and the like), the selection of lubricants (kinds and addition amounts), the selection of solvents, the selection of dispersing methods, and the selection of the conditions of calendering treatment are exemplified.

Since the peripheral speed is different at the inner and outer circles of the disc, there are, roughly speaking, the following methods of controlling the ratio of Fin/Fout.

(1) By restricting the recording region, the system is designed so that the ratio of Fin/Fout falls within the defined range.

(2) The disc rotation for the recording and reproduction at the inner periphery is altered from that at the outer periphery.

(3) Such a disc is produced that exhibits a frictional force weakly dependent on relative speed.

In particular, to achieve the above (3), the following methods may be adopted.

To reduce the frictional force in the outer periphery region (a high relative speed region), it is preferred to adopt a higher fatty acid ester exhibiting fluid lubrication. Specifically, those higher fatty acid esters described in 'Detailed Description in the Invention' are preferably used. In particular, by increasing the addition level to the magnetic layer and the non-magnetic layer, the frictional force at the high relative speed region (Fout) can be suppressed. But, when the addition level is raised too high, the frictional force at the low relative speed region (Fin) unfavorably increases. The specific addition level is 1 to 20% by weight, and preferably 3 to 15% by weight for the magnetic material in the magnetic layer and the non-magnetic powder in the non-magnetic lower layer. In particular, it is preferred that the addition level for the magnetic layer is set lower than that for the non-magnetic lower layer.

In addition, reduction of the frictional force in a low relative speed region (Fin) can be achieved by making the particle size of the non-magnetic powder added to the magnetic layer large, relaxing the degree of dispersion, etc. Specifically, an abrasive or carbon black having a large mean particle diameter may be incorporated in the magnetic layer, or the abrasive or carbon black to be incorporated and the magnetic material may be dispersed separately, followed by blending both dispersions together, etc.

A magnetic disc according to the present invention is described in detail below.

Magnetic Layer:

A magnetic disc in the invention is generally provided with a magnetic layer on both sides of a support, but may be provided on one side.

A magnetic layer provided on one side of a support may be a monolayer or may be multilayers each having different composition. It is preferred in the invention to provide a substantially nonmagnetic lower layer (also referred to as "a nonmagnetic layer" or "a lower layer") between a support and a magnetic layer by a wet-on-wet or wet-on-dry method. A magnetic layer is referred to as an upper layer or an upper magnetic layer.

Ferromagnetic powders for use in a magnetic layer are not especially restricted, but ferromagnetic metal powders and hexagonal ferrite powders are preferably used, and hexagonal ferrite powders are particularly preferred.

Ferromagnetic metal powders are not particularly limited so long as they contain α-Fe as a main component (including alloys). These ferromagnetic powders may contain, in addition to the prescribed atoms, e.g., Al, Si, S, Ca, Ti, V, Cr, Cu, Y, Mo, Rh, Pd, Ag, Sn, Ba, Ta, W, Au, Bi, La, Ce, Pr, Nd, P, Co, Mn, Zn, Ni, Sr and B. Ferromagnetic powders containing at least one of Al, Si, Ca, Y, Ba, La, Nd, Co, Ni and B in addition to α-Fe are preferred, and those containing Co, Al, Y and Nd are particularly preferred. Further in detail, ferromagnetic powders containing from 10 to 50 atomic % of Co, from 2 to 20 atomic % of Al, and from 3 to 20 atomic % of Y and Nd, respectively based on Fe, are preferred.

For bringing out the maximum of aptitude in high density region, ferromagnetic metal powders excellent in high output, high dispersibility and orientation are used in the invention. That is, high output and high durability can be attained with ferromagnetic metal powders comprising hyper-fine particles, particularly having an average long axis length of from 30 to 65 nm, having a crystallite size of from 80 to 140 Å, containing a great amount of Co, and containing Al and Y compounds as sintering inhibitors. In addition, it is necessary that these ferromagnetic metal powders be excellent in particle size distribution, so that they preferably have a variation coefficient of long axis length (standard deviation of long axis length/average long axis length) of from 0 to 30%, an average acicular ratio of from 3.5 to 7.5, a coercive force of from 143 to 223 kA/m, a saturation magnetization of from 85 to 125 A·m$^2$/kg, and a specific surface area by a BET method ($S_{BET}$) of from 45 to 120 m$^2$/g. These particles can be obtained by the methods disclosed in JP-A-9-22522, JP-A-9-106535, JP-A-6-340426, and JP-A-11-100213, and combinations of these methods.

For achieving high density recording, the coercive force of ferromagnetic powders is preferably high, e.g., from 143 to 223 kA/m, although it is dependent upon the performance of the recording head to be used. With the increase of a coercive force, overwriting of signals becomes a problem. Since the coercive force of ferromagnetic metal powders primarily originates in the anisotropy of configuration, the variation coefficient of configuration is preferably small.

As hexagonal ferrite magnetic powders, magnetoplumbite structural (M-type) hexagonal ferrites are preferably used, e.g., barium ferrite, strontium ferrite, lead ferrite, calcium ferrite, and various substitution products of these ferrites are exemplified. These hexagonal ferrite powders may contain, besides the prescribed atoms, the following atoms, e.g., Al, Si, S, Sc, Ti, V, Cr, Cu, Y, Mo, Rh, Pd, Ag, Sn, Ba, Ta, W, Re, Au, Pb, Bi, La, Ce, Pr, Nd, P, Co, Mn, Zn, Ni, Sr, B, Ge and Nb. Hexagonal ferrite powders containing the following elements can be generally used, e.g., Co—Ti, Co—Ti—Zr, Co—Nb, Co—Ti—Zn, Co—Zn—Nb, Ni—Ti—Zn, Nb—Zn, Ni—Ti, Zn—Ti and Zn—Ni. From the viewpoint of SFD, pure M-type ferrites are preferred to composite type ferrites full of spinel phase. Coercive force is controlled by the methods of controlling the composition, tabular diameter and tabular thickness of hexagonal ferrite, controlling the thickness of a spinel phase, controlling the amount of the substitution element of a spinel phase, and controlling the position of the substitution site of a spinel phase.

Hexagonal ferrite magnetic powders for use in the invention have an average tabular diameter of from 15 to 35 nm; a variation coefficient of tabular diameters of from 0 to 30%; an average tabular thickness of generally from 2 to 15 nm, particularly preferably from 4 to 10 nm; and an average tabular ratio of preferably from 1.5 to 4.5, more preferably from 2 to 4.2. When the average tabular diameter of hexagonal ferrite magnetic powders is in the above range, the specific surface area becomes an appropriate value, so that hexagonal ferrite powders can be easily dispersed. Hexagonal ferrite magnetic powders have a specific surface area ($S_{BET}$) of from 40 to 100 m$^2$/g, more preferably from 45 to 90 m$^2$/g. When the specific surface area is in this range, noise lowers and hexagonal ferrite powders can be easily dispersed, so that surface property is improved. Hexagonal ferrite magnetic powders have a moisture content of preferably from 0.3 to 2.0%. It is preferred to optimize the moisture content of magnetic powders by the kind of a binder. The pH of hexagonal ferrite magnetic powders is preferably optimized by the combination with a binder to be used. The pH is from 5.0 to 12, and preferably from 5.5 to 10.

Ferromagnetic powders may be subjected to treatment in advance before dispersion with the later-described dispersant, lubricant, surfactant and antistatic agent.

SFD of ferromagnetic powders themselves is preferably small, and it is necessary to make the distribution of Hc of ferromagnetic powders small. When SFD of a tape is small, magnetic flux revolution is sharp and peak shift becomes small, so that the tape is suitable for high density digital magnetic recording. For achieving small Hc distribution, making the particle size distribution of goethite in ferromagnetic metal powders good, using monodispersed α-Fe$_2$O$_3$, and preventing sintering among particles are effective methods.

Lower Layer:

A lower layer is described in detail below. A lower layer preferably comprises nonmagnetic inorganic powder and a binder as main components. Nonmagnetic inorganic powder for use in a lower layer can be selected from inorganic compounds, e.g., metallic oxide, metallic carbonate, metallic sulfate, metallic nitride, metallic carbide and metallic sulfide. The examples of inorganic compounds are selected from the following compounds and they can be used alone or in combination, e.g., α-alumina having an α-conversion rate of 90% or more, β-alumina, γ-alumina, θ-alumina, silicon carbide, chromium oxide, cerium oxide, α-iron oxide, hematite, goethite, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, and molybdenum disulfide. Of these compounds, titanium dioxide, zinc oxide, iron oxide and barium sulfate are particularly preferred for their small particle size distribution and various means for imparting functions, and titanium dioxide and α-iron oxide are more preferred. These nonmagnetic inorganic powders preferably have an average particle size of from 0.005 to 2 μm. A plurality of nonmagnetic inorganic powders each having a different average particle size may be combined, if necessary, or a single nonmagnetic inorganic powder having a broad particle size distribution may be used so as to attain the same effect as such a combination. A particularly preferred average particle size of nonmagnetic inorganic powders is from 0.01 to 0.2 μm. In particular, when nonmagnetic inorganic powders are granular metallic oxides, the average particle size of the granular metallic oxides is preferably 0.08 µm or less, and when nonmagnetic inorganic powders are acicular metallic oxides, the average long axis length of the acicular metallic oxides is preferably 0.3 µm or less, and more preferably 0.2 µm or less. Nonmagnetic inorganic powders for use in the invention have a tap density of generally from 0.05 to 2 g/ml, and preferably from 0.2 to 1.5 g/ml; a moisture content of generally from 0.1 to 5 mass % (weight %), preferably from 0.2 to 3 mass %, and more preferably from 0.3 to 1.5 mass %; a pH value of generally from 2 to 11, and particularly preferably from 5.5 to 10; and a specific surface area of generally from 1 to 100 $m^2/g$, preferably from 5 to 80 $m^2/g$, and more preferably from 10 to 70 $m^2/g$.

Nonmagnetic inorganic powders have a crystallite size of preferably from 0.004 to 1 µm, and more preferably from 0.04 to 0.1 µm; an oil absorption amount using DBP (dibutyl phthalate) of generally from 5 to 100 ml/100 g, preferably from 10 to 80 ml/100 g, and more preferably from 20 to 60 ml/100 g; and a specific gravity of generally from 1 to 12, and preferably from 3 to 6. The configuration of nonmagnetic inorganic powders may be any of acicular, spherical, polyhedral and tabular configurations. Nonmagnetic inorganic powders have a Mohs' hardness of preferably from 4 to 10; an adsorption amount of SA (stearic acid) of from 1 to 20 $\mu mol/m^2$, preferably from 2 to 15 $\mu mol/m^2$, and more preferably from 3 to 8 $\mu mol/m^2$; and pH of from 3 to 6. The surfaces of these nonmagnetic inorganic powders may be covered with $Al_2O_3$, $SiO_2$, $TiO_2$, $ZrO_2$, $SnO_2$, $Sb_2O_3$, $ZnO$ or $Y_2O_3$. $Al_2O_3$, $SiO_2$, $TiO_2$ and $ZrO_2$ are preferred in the point of dispersibility, and $Al_2O_3$, $SiO_2$ and $ZrO_2$ are more preferred. These surface-covering compounds may be used in combination or they may be used alone. Surface treatment may be performed by coprecipitation, alternatively surface treatment of powders may be performed in such a manner that particle surfaces are covered with alumina in the first place, and then the alumina-covered particles are covered with silica, or vice versa, according to purposes. A surface-covered layer may be porous, if necessary, but a homogeneous and dense layer is generally preferred.

The specific examples and manufacturing methods of the nonmagnetic inorganic powders for use in a lower layer in the invention are disclosed in WO 98/35345.

By incorporating carbon blacks into a lower layer, surface electrical resistance (Rs) and light transmittance can be reduced, which are well known effects, and a desired micro Vickers hardness can be obtained. It is also possible to bring about the effect of stocking a lubricant by incorporating carbon blacks into a lower layer. Furnace blacks for rubbers, thermal blacks for rubbers, carbon blacks for coloring and acetylene blacks can be used as carbon blacks. Carbon blacks used in a lower layer should optimize the characteristics as described below according to the desired effects and sometimes more effects can be obtained by the combined use.

Carbon blacks for use in a lower layer have a specific surface area of generally from 100 to 500 $m^2/g$, preferably from 150 to 400 $m^2/g$, a DBP oil absorption amount of generally from 20 to 400 ml/100 g, preferably from 30 to 400 ml/100 g, and an average particle size of generally from 5 to 80 nm, preferably from 10 to 50 nm, and more preferably from 10 to 40 nm. A small amount of carbon blacks having an average particle size of 80 nm or greater may be contained. Carbon blacks preferably have pH of from 2 to 10, a moisture content of from 0.1 to 10%, and a tap density of from 0.1 to 1 g/ml.

The specific examples of carbon blacks for use in a lower layer are disclosed in WO 98/35345. Carbon blacks can be used in the range not exceeding 50 mass % based on the above nonmagnetic inorganic powders (not including carbon blacks) and not exceeding 40% based on the total mass of nonmagnetic layers. Carbon blacks can be used alone or in combination. Regarding the carbon blacks for use in the present invention, compiled by Carbon Black Association, *Carbon Black Binran* (*Handbook of Carbon Blacks*) can be referred to.

Organic powders can be used in a lower layer according to purpose, e.g., acrylic styrene resin powders, benzoguanamine resin powders, melamine resin powders and phthalocyanine pigments are exemplified. In addition, polyolefin resin powders, polyester resin powders, polyamide resin powders, polyimide resin powders and polyethylene fluoride resin powders can also be used. The producing methods of these organic powders are disclosed in JP-A-62-18564 and JP-A-60-255827.

The binder resins, lubricants, dispersants, additives, solvents, dispersing methods and others used in a magnetic layer described later can be used in a lower layer. In particular, with respect to the amounts and the kinds of binder resins, additives, the amounts and the kinds of dispersants, well-known techniques regarding a magnetic layer can be applied to a lower layer.

Binder:

Conventionally well-known thermoplastic resins, thermosetting resins, reactive resins and the mixtures of these resins are used as a binder in the invention.

Thermoplastic resins having a glass transition temperature of from −100 to 150° C., a number average molecular weight of from 1,000 to 200,000, preferably from 10,000 to 100,000, and a polymerization degree of from about 50 to about 1,000 can be used in the invention.

The examples of these thermoplastic resins include polymers or copolymers containing, as the constituting unit, vinyl chloride, vinyl acetate, vinyl alcohol, maleic acid, acrylic acid, acrylic ester, vinylidene chloride, acrylonitrile, methacrylic acid, methacrylic ester, styrene, butadiene, ethylene, vinyl butyral, vinyl acetal or vinyl ether; polyurethane resins and various rubber resins. The examples of thermosetting resins and reactive resins include phenolic resins, epoxy resins, curable type polyurethane resins, urea resins, melamine resins, alkyd resins, acrylic reactive resins, formaldehyde resins, silicone resins, epoxy-polyamide resins, mixtures of polyester resins and isocyanate prepolymers, mixtures of polyesterpolyol and polyisocyanate, and mixtures of polyurethane and polyisocyanate. These resins are described in detail in *Plastic Handbook*, Asakura Shoten. It is also possible to use well-known electron beam-curable type resins in each layer. The examples of these resins and manufacturing methods are disclosed in detail in JP-A-62-256219. These resins can be used alone or in combination. The examples of preferred combinations include at least one resin selected from vinyl chloride resins, vinyl chloride-vinyl acetate copolymers, vinyl chloride-vinyl acetate-vinyl alcohol copolymers, and vinyl chloride-vinyl acetate-maleic anhydride copolymers with a polyurethane resin, and combinations of these resins with polyisocyanate.

Polyurethane resins having well known structures, e.g., polyester polyurethane, polyether polyurethane, polyether polyester polyurethane, polycarbonate polyurethane, polyester polycarbonate polyurethane and polycaprolactone polyurethane can be used. With respect to all the binders described above, for the purpose of obtaining more excellent dispersibility and durability, it is preferred to use at least one polar group selected from the following by copolymerization or addition reaction, according to necessity, e.g., —COOM, —SO$_3$M, —OSO$_3$M, —P=O(OM)$_2$, —O—P=O(OM)$_2$ (wherein M represents a hydrogen atom or an alkali metal salt group), —NR$_2$, —N$^+$R$_3$ (wherein R represents a hydrocarbon group), an epoxy group, —SH and —CN. The amount of the polar group added is from $10^{-1}$ to $10^{-8}$ mol/g, preferably from $10^{-2}$ to $10^{-6}$ mol/g. It is preferred for polyurethane resins to have at least one OH group at each terminal of a polyurethane molecule, i.e., two or more in total, besides the above polar groups. Since OH groups form a three dimensional network structure by crosslinking with a polyisocyanate curing agent, they are preferably contained in a molecule as many as possible. In particular, it is preferred that OH groups be present at terminals of a molecule, since the reactivity with the curing agent becomes high. It is preferred for polyurethane to have three or more OH groups, particularly preferably four or more OH groups, at terminals of a molecule. When polyurethane is used in the invention, the polyurethane has a glass transition temperature of generally from −50 to 150° C., preferably from 0 to 100° C., and particularly preferably from 30 to 100° C., breaking extension of from 100 to 2,000%, breaking stress of generally from 0.05 to 10 kg/mm$^2$ (=about 0.49 to 98 MPa), and a yielding point of from 0.05 to 10 kg/mm$^2$ (=about 0.49 to 98 MPa). Due to these physical properties, a coating film having good mechanical properties can be obtained.

The specific examples of binders for use in the invention include as vinyl chloride copolymers VAGH, VYHH, VMCH, VAGF, VAGD, VROH, VYES, VYNC, VMCC, XYHL, XYSG, PKHH, PKHJ, PKHC and PKFE (manufactured by Union Carbide Co., Ltd.), MPR-TA, MPR-TA5, MPR-TAL, MPR-TSN, MPR-TMF, MPR-TS, MPR-TM and MPR-TAO (manufactured by Nisshin Chemical Industry Co., Ltd.), 1000W, DX80, DX81, DX82, DX83 and 100FD (manufactured by Electro Chemical Industry Co., Ltd.), MR-104, MR-105, MR-110, MR-100, MR-555 and 400X-110A (manufactured by Nippon Zeon Co., Ltd.); and as polyurethane resins Nippollan N2301, N2302 and N2304 (manufactured by Nippon Polyurethane Co., Ltd.), Pandex T-5105, T-R3080, T-5201, Burnock D-400, D-210-80, Crisvon 6109 and 7209 (manufactured by Dainippon Ink and Chemicals Inc.), Vylon UR8200, UR8300, UR8700, RV530 and RV280 (manufactured by Toyobo Co., Ltd.), polycarbonate polyurethane, Daipheramine 4020, 5020, 5100, 5300, 9020, 9022 and 7020 (manufactured by Dainichiseika Color & Chemicals Mfg. Co., Ltd), polyurethane, MX5004 (manufactured by Mitsubishi Kasei Corp.), polyurethane, Sanprene SP-150 (manufactured by Sanyo Chemical Industries, Co., Ltd.), and polyurethane, Saran F310 and F210 (manufactured by Asahi Kasei Corporation).

The amount of binders for use in a nonmagnetic layer and a magnetic layer is from 5 to 50 mass %, preferably from 10 to 30 mass %, respectively based on the nonmagnetic inorganic powder and the magnetic powder. When vinyl chloride resins are used, the amount is from 5 to 30 mass %, when polyurethane resins are used, the amount is from 2 to 20 mass %, and it is preferred to use polyisocyanate in an amount of from 2 to 20 mass % in combination with these resins, however, for instance, when the corrosion of heads is caused by a slight amount of chlorine due to dechlorination, it is also possible to use polyurethane alone or a combination of polyurethane and isocyanate alone.

A magnetic recording medium according to the invention comprises two or more layers, the amount of binder, the amounts of vinyl chloride resin, polyurethane resin, polyisocyanate or other resins contained in a binder, the molecular weight of each resin constituting a magnetic layer, the amount of polar groups, or the physical properties of the above-described resins can of course be varied in each layer according to necessity. These factors should be rather optimized in each layer. Well-known techniques with respect to multilayer magnetic layers can be used in the invention. For example, when the amount of a binder is varied in each layer, it is effective to increase the amount of a binder contained in a magnetic layer to reduce scratches on the magnetic layer surface. For improving the head touch against a head, it is effective to increase the amount of the binder in a nonmagnetic layer to impart flexibility.

The examples of polyisocyanates for use in the invention include isocyanates, e.g., tolylenediisocyanate, 4,4'-diphenylmethanediisocyanate, hexamethylenediisocyanate, xylylenediisocyanate, naphthylene-1,5-diisocyanate, o-toluidinediisocyanate, isophoronediisocyanate and triphenylmethanetriisocyanate; products of these isocyanates with polyalcohols; and polyisocyanates formed by condensation reaction of isocyanates. These isocyanates are commercially available under the trade names of Coronate L, Coronate HL, Coronate 2030, Coronate 2031, Millionate MR and Millionate MTL (manufactured by Nippon Polyurethane Co., Ltd.), Takenate D-102, Takenate D-110N, Takenate D-200 and Takenate D-202 (manufactured by Takeda Chemical Industries, Ltd.), and Desmodur L, Desmodur IL, Desmodur N and Desmodur HL (manufactured by Sumitomo Bayer Co., Ltd.). These compounds may be used alone, or in combination of two or more in each layer taking advantage of the difference in curing reactivity.

Carbon Black, Abrasive:

Carbon blacks for use in a magnetic layer in the present invention include furnace blacks for rubbers, thermal blacks for rubbers, carbon blacks for coloring, and acetylene blacks. Carbon blacks for use in the present invention have a specific surface area of from 5 to 500 m$^2$/g, a DBP oil absorption amount of from 10 to 400 ml/100 g, an average particle size of from 5 to 300 nm, a pH value of from 2 to 10, a moisture content of from 0.1 to 10%, and a tap density of from 0.1 to 1 g/ml. The specific examples of these carbon blacks are disclosed in WO 98/35345.

Carbon blacks can serve various functions such as the prevention of static charges of a magnetic layer, the reduction of a friction coefficient, the impartation of a light-shielding property and the improvement of film strength. Such functions differ depending upon the kind of carbon blacks to be used. Accordingly, when the invention takes a multilayer structure, it is of course possible to select and determine the kinds, the amounts and the combinations of the carbon blacks to be added to each layer on the basis of the above-described various properties such as the particle size, the oil absorption amount, the electrical conductance and the pH value, or these should be rather optimized in each layer.

It is preferred to use diamond particles as an abrasive in the invention. Diamond particles have an average particle size of preferably from 1/5 to 2 times the thickness of a magnetic layer, more preferably 1/2 to 1.5 times, still more preferably from 0.8 to 1.2 times. The blending ratio of diamond particles is preferably from 0.1 to 5.0 mass % of the ferromagnetic powders, and more preferably from 0.5 to 3 mass %.

Abrasives other than diamond particles can be used in combination in a magnetic layer in the present invention. Well known materials essentially having a Mohs' hardness of 6 or higher can be used as abrasives in a magnetic layer in the invention alone or in combination, e.g., α-alumina having an α-conversion rate of 90% or more, β-alumina, silicon carbide, chromium oxide, cerium oxide, α-iron oxide, corundum, silicon nitride, titanium carbide, titanium oxide, silicon dioxide and boron nitride. The composites of these abrasives (abrasives obtained by surface-treating with other abrasives) may also be used. Compounds or elements other than their main components are often contained in abrasives, but the intended effects can be attained so long as the content of main component is 90% or more. These abrasives preferably have an average particle size of from 0.01 to 2 μm and, in particular, for improving electromagnetic characteristics, it is preferred to use abrasives having narrow particle size distribution. For improving durability, abrasives each having different particle size may be combined according to necessity, or a single abrasive having broad particle size distribution may be used so as to attain the same effect as such a combination. Abrasives for use in the invention preferably have a tap density of from 0.3 to 2 g/ml, a moisture content of from 0.1 to 5%, a pH value of from 2 to 11, and a specific surface area of from 1 to 30 m$^2$/g. The configurations of abrasives for use in the invention may be any of acicular, spherical and die-like configurations, but abrasives having a configuration partly with edges are preferred for their high abrasive property. The specific examples of these abrasives are disclosed in WO 98/35345. The particle sizes and the amounts of abrasives to be added to a magnetic layer and a nonmagnetic layer should be independently set at optimal values.

Additive:

As additives for use in a magnetic layer and a nonmagnetic layer in the invention, those having a lubricating effect, an antistatic effect, a dispersing effect and a plasticizing effect are used and comprehensive improvement of performances can be contrived by combining additives. As additives having a lubricating effect, lubricants giving a remarkable action on agglutination caused by the friction of surfaces of materials with each other are used. Lubricants are classified into two types. Lubricants that are used for a magnetic disc cannot be judged completely whether they show fluid lubrication or boundary lubrication, but according to general concept they are classified into higher fatty acid esters, liquid paraffin and silicon derivatives which show fluid lubrication, and long chain fatty acids, fluorine surfactants and fluorine-containing polymers which show boundary lubrication. In a coating type magnetic recording medium, lubricants exist in a state dissolved in a binder or in a state of partly being adsorbed onto the surface of hexagonal ferrite magnetic powder, and they migrate to the surface of a magnetic layer. The speed of migration depends upon whether the compatibility of a binder and a lubricant is good or bad. The speed of migration is slow when the compatibility of a binder and a lubricant is good and the migration speed is fast when the compatibility is bad. As one idea as to good or bad of the compatibility, there is a means of comparison of dissolution parameters of a binder and a lubricant. A nonpolar lubricant is effective for fluid lubrication and a polar lubricant is effective for boundary lubrication.

In the present invention, it is preferred to use a higher fatty acid ester showing fluid lubrication and a long chain fatty acid showing boundary lubrication each having different characteristics in combination, and it is more preferred to combine at least three of these lubricants. Solid lubricants can also be used in combination with these lubricants.

The examples of solid lubricants that can be used in combination include molybdenum disulfide, tungsten disulfide, graphite, boron nitride and graphite fluoride. The examples of long chain fatty acids showing boundary lubrication include monobasic fatty acids having from 10 to 24 carbon atoms (they may contain an unsaturated bond or may be branched) and metal salts of these monobasic fatty acids (e.g., with Li, Na, K or Cu). The examples of fluorine surfactants and fluorine-containing polymers include fluorine-containing silicones, fluorine-containing alcohols, fluorine-containing esters, fluorine-containing alkyl sulfates and alkali metal salts of these compounds. The examples of higher fatty acid esters showing fluid lubrication include fatty acid monoesters, fatty acid diesters and fatty acid triesters composed of a monobasic fatty acid having from 10 to 24 carbon atoms (which may contain an unsaturated bond or may be branched) and any one of mono-, di-, tri-, tetra-, penta- and hexa-alcohols having from 2 to 12 carbon atoms (which may contain an unsaturated bond or may be branched), and fatty acid esters of monoalkyl ethers of alkylene oxide polymers. In addition to the above, the examples further include liquid paraffin, and as silicon derivatives, silicone oils, e.g., dialkylpolysiloxane (the alkyl group has from 1 to 5 carbon atoms), dialkoxypolysiloxane (the alkoxyl group has from 1 to 4 carbon atoms), monoalkyl-monoalkoxypolysiloxane (the alkyl group has from 1 to 5 carbon atoms and the alkoxyl group has from 1 to 4 carbon atoms), phenylpolysiloxane, and fluoroalkylpolysiloxane (the alkyl group has from 1 to 5 carbon atoms), silicones having a polar group, fatty acid-modified silicones, and fluorine-containing silicones.

The examples of other lubricants include alcohols, e.g., mono-, di-, tri-, tetra-, penta- and hexa-alcohols having from 12 to 22 carbon atoms (they may contain an unsaturated bond or may be branched), alkoxy alcohols having from 12 to 22 carbon atoms (they may contain an unsaturated bond or may be branched), and fluorine-containing alcohols, polyethylene waxes, polyolefins such as polypropylene, ethylene glycols, polyglycols such as polyethylene oxide waxes, alkyl phosphates and alkali metal salts of alkyl phosphates, alkyl sulfates and alkali metal salts of alkyl sulfates, polyphenyl ethers, fatty acid amides having from 8 to 22 carbon atoms, and aliphatic amines having from 8 to 22 carbon atoms.

The examples of additives having an antistatic effect, a dispersing effect and a plasticizing effect include phenylphosphonic acid, specifically "PPA" (manufactured by Nissan Chemical Industries, Ltd.), α-naphthylphosphoric acid, phenylphosphoric acid, diphenylphosphoric acid, p-ethyl-benzenephosphonic acid, phenylphosphinic acid, aminoquinones, various kinds of silane coupling agents, titanium coupling agents, fluorine-containing alkyl sulfates and alkali metal salts of these compounds.

Lubricants that are particularly preferably used in the invention are fatty acids and fatty acid esters, and the specific examples are disclosed in WO98/35345. Besides the above, other different lubricants and additives can be used in combination as well.

Additionally, nonionic surfactants, e.g., alkylene oxides, glycerols, glycidols and alkylphenol-ethylene oxide adducts; cationic surfactants, e.g., cyclic amines, ester amides, quaternary ammonium salts, hydantoin derivatives, heterocyclic rings, phosphoniums and sulfoniums; anionic surfactants containing an acid group, such as carboxylic acid, sulfonic acid, phosphoric acid, a sulfuric ester group and a phosphoric ester group; and amphoteric surfactants, e.g., amino acids, aminosulfonic acids, sulfuric esters or phosphoric esters of amino alcohols, and alkylbetaines can also be used. These surfactants are described in detail in *Kaimen Kasseizai Binran* (*Handbook of Surfactants*) (published by Sangyo Tosho Co., Ltd.). These lubricants and antistatic agents need not be 100% pure and may contain impurities such as isomers, unreacted products, byproducts, decomposed products and oxides, in addition to the main component. However, the content of impurities is preferably 30% or less, more preferably 10% or less.

As disclosed in WO 98/35345, it is also preferred to use a monoester and a diester in combination as fatty acid esters in the present invention.

The surface of a magnetic layer in the invention has a C/Fe peak ratio measured by Auger electron spectroscopy of preferably from 5 to 100, particularly preferably from 5 to 80. The measuring conditions of the C/Fe peak ratio by Auger electron spectroscopy are as follows.
Instrument: Model PHI-660, manufactured by Φ Co.
Measuring Conditions:
  Primary electron beam accelerating voltage: 3 KV
  Electric current of sample: 130 nA
  Magnification: 250-fold
  Inclination angle: 30°

The value of C/Fe peak ratio is obtained as the C/Fe ratio by integrating the values obtained under the above conditions in the region of kinetic energy of 130 eV to 730 eV three times and finding the strengths of KLL peak of the carbon and LMM peak of the iron as differentials.

The amount of the lubricants contained in each of an upper layer and a lower layer of a magnetic recording medium in the invention is preferably from 5 to 30 mass parts per 100 mass parts of the ferromagnetic powder and the nonmagnetic inorganic powder respectively.

Lubricants and surfactants for use in the invention individually have different physical functions. The kinds, amounts and combining proportions bringing about synergistic effects of these lubricants should be determined optimally in accordance with the purpose. A nonmagnetic layer and a magnetic layer can separately contain different fatty acids each having a different melting point so as to prevent bleeding out of the fatty acids to the surface, or different esters each having a different boiling point, a different melting point or a different polarity so as to prevent bleeding out of the esters to the surface. Also, the amount of the surfactant is controlled so as to improve the coating stability, or the amount of the lubricant in the intermediate layer is made larger so as to improve the lubricating effect. The examples are by no means limited thereto. In general, the total amount of lubricants is from 0.1 to 50 mass %, preferably from 2 to 25 mass %, based on the amount of the ferromagnetic powder or the nonmagnetic powder.

All or a part of the additives to be used in the invention may be added to a magnetic coating solution or a nonmagnetic coating solution in any step of preparation. For example, additives may be blended with magnetic powder before a kneading step, may be added in a step of kneading magnetic powder, a binder and a solvent, may be added in a dispersing step, may be added after a dispersing step, or may be added just before coating. According to the purpose, there are cases of capable of attaining the object by coating all or a part of additives simultaneously with or successively after the coating of a magnetic layer. Further, according to purpose, a lubricant maybe coated on the surface of a magnetic layer after calendering treatment or after completion of slitting.

Layer Constitution:

The thickness of the support of a magnetic disc in the invention is generally from 2 to 100 μm, preferably from 2 to 80 μm.

An undercoat layer may be provided between a support, preferably a nonmagnetic flexible support, and a nonmagnetic or magnetic layer for adhesion improvement. The thickness of the undercoat layer is from 0.01 to 0.5 μm, preferably from 0.02 to 0.5 μm.

A backing layer may be provided on the side of a support opposite to the side having a magnetic layer for the purpose of providing static charge prevention and curling correction. The thickness of the backing layer is generally from 0.1 to 4 μm, preferably from 0.3 to 2.0 μm. Well-known undercoat layers and backing layers can be used for this purpose.

The thickness of a magnetic layer having the constitution comprising a lower layer and an upper layer in the invention is as described above, but the thickness is optimized by the amount of saturation magnetization of the head to be used, the head gap length and the recording signal zone. The thickness of a lower layer is generally from 0.2 to 5.0 μm, preferably from 0.3 to 3.0 μm, and more preferably from 1.0 to 2.5 μm.

A lower layer exhibits the effect of the invention so long as it is substantially nonmagnetic even if, or intentionally, it contains a small amount of magnetic powder as the impurity, which can be as a matter of course regarded as essentially the same constitution as in the invention. The terminology "substantially nonmagnetic" means that the residual magnetic flux density of a lower layer is 100 mT or less or the coercive force of a lower layer is 100 Oe (=about 8 kA/m) or less, preferably the residual magnetic flux density and the coercive force are zero. When a lower layer contains magnetic powder, the content of the magnetic powder is preferably less than ½ of the total inorganic powders contained in the lower layer. In place of a nonmagnetic layer, a soft magnetic layer containing soft magnetic powder and a binder may be formed as a lower layer. The thickness of the soft magnetic layer is the same as the thickness of a lower layer as described above.

Support:

A support for use in the invention is preferably a nonmagnetic flexible support, and essentially has a thermal shrinkage factor of preferably 0.5% or less at 100° C. for 30 minutes, and of preferably 0.5% or less at 80° C. for 30 minutes, more preferably 0.2% or less, in every direction of in-plane of the support. Further, the thermal shrinkage factors of the support at 100° C. for 30 minutes and at 80° C. for 30 minutes are preferably almost equal in every direction of in-plane of the support with difference of not more than 10%. The support is preferably a nonmagnetic support. As nonmagnetic supports, well-known films such as polyesters (e.g., polyethylene terephthalate and polyethylene naphthalate), polyolefins, cellulose triacetate, polycarbonate, aromatic or aliphatic polyamide, polyimide, polyamideimide, polysulfone and polybenzoxazole can be used. High strong supports such as polyethylene naphthalate and polyamide are preferably used. If necessary, a lamination type support as disclosed in JP-A-3-224127 can be used to vary the surface roughness of a magnetic layer surface and a base surface. These supports may be subjected in advance to surface activation treatment, e.g., corona discharge treatment, plasma treatment, adhesion assisting treatment, heat treatment or dust-removing treatment. Aluminum or glass substrate can also be used as a support in the invention.

For attaining the object of the invention, it is preferred to use a support having a central plane average surface roughness (Ra) of 4.0 nm or less, preferably 2.0 nm or less, measured by a surface roughness meter TOPO-3D (a product of WYKO Co.). It is preferred that the support not only has a small central plane average surface roughness but also is free from coarse spines having heights of 0.5 μm or more. Surface roughness configuration is freely controlled by the size and the amount of a filler added to a support. The examples of fillers include oxides and carbonates of Ca, Si and Ti, and acrylic-based organic powders. A support for use in the invention preferably has a maximum height (Rmax) of 1 μm or less, a ten point average roughness (Rz) of 0.5 μm or less, a central plane peak height (Rp) of 0.5 μm or less, a central plane valley depth (Rv) of 0.5 μm or less, a central plane area factor (Sr) of from 10% to 90%, and average wavelength (λa) of from 5 to 300 μm. For obtaining desired electromagnetic characteristics and durability, the spine distribution on the surface of a support can be controlled arbitrarily by using fillers, e.g., the number of spines having sizes of from 0.01 to 1 μm can be controlled each within the range of from 0 to 2,000 per 0.1 mm$^2$.

Supports for use in the invention have an F-5 value of preferably from 5 to 50 kg/mm$^2$ (=about 49 to 490 MPa), a thermal shrinkage factor at 100° C. for 30 minutes of preferably 3% or less, more preferably 1.5% or less, a thermal shrinkage factor at 80° C. for 30 minutes of preferably 1% or less, more preferably 0.5% or less, a breaking strength of from 5 to 100 kg/mm$^2$ (=about 49 to 980 MPa), an elastic modulus of from 100 to 2,000 kg/mm$^2$ (=about 0.98 to 19.6 GPa), a temperature expansion coefficient of from $10^{-4}$ to $10^{-8}$/° C., preferably from $10^{-5}$ to $10^{-6}$/° C., and a humidity expansion coefficient of $10^{-4}$/RH % or less, preferably $10^{-5}$/RH % or less. These thermal, dimensional and mechanical strength characteristics are preferably almost equal in every direction of in-plane of supports with difference of not more than 10%.

Manufacturing Method:

The manufacturing process of a magnetic coating solution of a magnetic disc in the invention comprises at least a kneading step, a dispersing step and optionally a blending step to be carried out before and/or after the kneading and dispersing steps. Each of these steps may be composed of two or more separate stages. All the feedstock such as magnetic powder, nonmagnetic powder, a binder, a carbon black, an abrasive, an antistatic agent, a lubricant and a solvent for use in the invention may be added at any step at any time. Each feedstock may be added at two or more steps dividedly. For example, polyurethane can be added dividedly at a kneading step, a dispersing step, or a blending step for adjusting viscosity after dispersion. For achieving the object of the invention, conventionally well-known techniques can be performed partly with the above steps. Powerful kneading machines such as an open kneader, a continuous kneader, a pressure kneader and an extruder are preferably used in a kneading step. When a kneader is used, all or a part of the binder (preferably 30% or more of the total binder) is kneaded in the range of from 15 to 500 parts per 100 parts of the magnetic powder together with the magnetic powder or nonmagnetic powder. These kneading treatments are disclosed in detail in JP-A-1-106338 and JP-A-1-79274. For dispersing a magnetic layer coating solution and a nonmagnetic layer coating solution, glass beads can be used, but dispersing media having a high specific gravity, e.g., zirconia beads, titania beads and steel beads are preferred for this purpose. Optimal particle size and packing density of these dispersing media have to be selected. Well-known dispersers can be used in the invention.

After coating a coating solution on a support, the magnetic disc is subjected to orientation treatment as desired.

In the case of a magnetic disc, an isotropic orienting property can be sufficiently obtained in some cases without performing orientation with orientating apparatus, but it is preferred to use well-known random orientation apparatus, e.g., disposing cobalt magnets diagonally and alternately or applying an alternating current magnetic field with a solenoid. Hexagonal ferrite magnetic powders have generally an inclination for three-dimensional random orientation of in-plane and in the perpendicular direction, however, it is also possible to make in-plane two-dimensional random orientation. It is also possible to impart isotropic magnetic characteristics in the circumferential direction by perpendicular orientation using well-known methods, e.g., using different pole and counter position magnets. In particular, perpendicular orientation is preferred when the disc is used in high density recording. Circumferential orientation can be performed using spin coating.

After coating and drying, the web having the coated layer is preferably subjected to calendering treatment.

Heat resistive plastic rolls, e.g., epoxy, polyimide, polyamide and polyimideamide or metal rolls are used as calendering treatment rolls. Metal rolls are preferably used for the treatment particularly when magnetic layers are coated on both surfaces of a support. The treatment temperature is preferably 50° C. or more, more preferably 100° C. or more. The linear pressure is preferably 200 kg/cm (=about 196 kN/m) or more, more preferably 300 kg/cm (=about 294 kN/m) or more.

Physical Properties:

Residual magnetic flux density×magnetic layer thickness of a magnetic disc in the invention is preferably from 5 to 300 mT·μm. The coercive force (Hc) is preferably from 1,800 to 5,000 Oe (=about 144 to 400 kA/m), more preferably from 1,800 to 3,000 Oe (=about 144 to 240 kA/m). The distribution of the coercive force is preferably narrow, and SFD (switching field distribution) and SFDr are preferably 0.6 or less.

The squareness ratio (SQ) of a magnetic disc is from 0.55 to 0.67, preferably from 0.58 to 0.64, in the case of two dimensional random orientation, from 0.45 to 0.55 in the case of three dimensional random orientation, and in the case of perpendicular orientation generally 0.6 or more in the perpendicular direction, preferably 0.7 or more, and 0.7 or more when diamagnetic correction is performed, preferably 0.8 or more. Degree of orientation in two-dimensional random orientation and three-dimensional random orientation is preferably 0.8 or more. In the case of two-dimensional random orientation, the squareness ratio in the perpendicular direction, the Br in the perpendicular direction, and the Hc in the perpendicular direction are preferably from 0.1 to 0.5 times as small as those in the in-plane direction.

A magnetic recording medium in the invention has the intrinsic resistivity of the surface of a magnetic layer of preferably from $10^4$ to $10^{12}$ Ω/sq, and a charge potential of preferably from −500 V to +500 V. The elastic modulus at 0.5% elongation of a magnetic layer is preferably from 100 to 2,000 kg/mm2 (=about 980 to 19,600 MPa) in every direction of in-plane, the breaking strength is preferably from 10 to 70 kg/mm$^2$ (=about 98 to 686 MPa), the elastic modulus of a magnetic disc is preferably from 100 to 1,500 kg/mm$^2$ (=about 980 to 14,700 MPa) in every direction of in-plane, the residual elongation is preferably 0.5% or less, and the thermal shrinkage factor at every temperature of 100° C. or less is preferably 1% or less, more preferably 0.5% or less, and most preferably 0.1% or less. The glass transition temperature of a magnetic layer (the maximum point of the loss elastic modulus by dynamic viscoelasticity measurement at 110 Hz) is preferably from 50 to 120° C., and that of a lower layer is preferably from 0 to 100° C. The loss elastic modulus is preferably in the range of from $1 \times 10^7$ to $8 \times 10^8$ Pa, and loss tangent is preferably 0.2 or less. When loss tangent is too large, adhesion failure is liable to occur. These thermal and mechanical characteristics are preferably almost equal in every direction of in-plane of the medium with difference of not more than 10%. The residual amount of a solvent in a magnetic layer is preferably 100 mg/m$^2$ or less, more preferably 10 mg/m$^2$ or less. The void ratio of a coated layer is preferably 30% by volume or less, more preferably 20% by volume or less, with both of a lower layer and an upper layer. The void ratio is preferably smaller for obtaining high output but in some cases a specific value should be preferably secured depending upon purposes. For example, in a disc medium that is repeatedly used, large void ratio contributes to good running durability in many cases.

A magnetic layer surface has a central plane average surface roughness (Ra) measured with a surface roughness meter TOPO-3D (a product of WYKO Co.) of preferably 5.0 nm or less, more preferably 4.0 nm or less, and especially preferably 3.5 nm or less. A magnetic layer preferably has a maximum height (Rmax) of 0.5 µm or less, a ten point average roughness (Rz) of 0.3 µm or less, a central plane peak height (Rp) of 0.3 µm or less, a central plane valley depth (Rv) of 0.3 µm or less, a central plane area factor (Sr) of from 20% to 80%, and average wavelength (λa) of from 5 to 300 µm. The surface spines of a magnetic layer of sizes of from 0.01 to 1 µm can be controlled arbitrarily within the range of from 0 to 2,000, and surface spines are preferably optimized. Surface spines can be easily controlled by the control of the surface property of a support by using fillers, the particle size and the amount of magnetic powders added to a magnetic layer, or by the surface configurations of the rolls of calender treatment. Curing is preferably within ±3 mm. It can be easily presumed that these physical properties of a magnetic disc in the invention can be varied according to purposes in a lower layer and an upper layer. For example, the elastic modulus of an upper layer is made higher to improve running durability and at the same time the elastic modulus of a lower layer is made lower that that of the upper layer to improve the head touching of the magnetic disc.

EXAMPLES

The invention is specifically described with reference to examples and comparative examples. "Parts" in the following means "parts by mass".

Sample 1:

Each composition of magnetic coating solution A and nonmagnetic coating solution shown below was blended in a kneader, and magnetic coating solution A was dispersed with a sand mill at 2,000 rpm for 12 hours, and the nonmagnetic coating solution was dispersed with a sand mill at 2,000 rpm for 3 hours. Polyisocyanate was added to each dispersion of the obtained magnetic coating solution A and nonmagnetic coating solution, in an amount of 3 parts to magnetic coating solution A and 6 parts to the nonmagnetic coating solution, and 30 parts of cyclohexanone was added to each solution. Each solution was filtered through a filter having an average pore diameter of 1 µm to obtain coating solutions for forming a magnetic layer and a nonmagnetic layer.

The thus-obtained nonmagnetic coating solution was coated on a polyethylene naphthalate support having a thickness of 53 µm and a central plane average surface roughness of 3 nm in a dry thickness of 1.5 µm and dried, and then the magnetic coating solution was coated in a thickness of 0.15 µm. After drying, the coated layer was subjected to calendering treatment with seven-stage calender at 90° C. and linear pressure of 300 kg/cm. The obtained web was punched out to a disc of 3.7 inches, and the disc was further heat-treated in a thermostat at 55° C. for 24 hours.

Samples 2 and 3:

Samples 2 and 3 were produced in the same manner as in the preparation of sample 1 except that the amount of isocetyl stearate in magnetic coating solution A or the nonmagnetic coating solution was changed to the amount shown in Table 1 below.

Sample 4:

Sample 4 was produced in the same manner as in the preparation of sample 1 except that magnetic coating solution B shown below was used in place of magnetic coating solution A, each composition was blended in a kneader, dispersed with a sand mill at 2,000 rpm for 6 hours, 1 part of carbon black #50 (manufactured by Asahi Carbon Co., Ltd.) was added to each coating solution, and further dispersed for 6 hours.

Sample 5:

Sample 5 was produced in the same manner as in the preparation of sample 1 except that magnetic coating solution B shown below was used in place of magnetic coating solution A, each composition was blended in a kneader, dispersed with a sand mill at 2,000 rpm for 8 hours, 1 part of carbon black #50 (manufactured by Asahi Carbon Co., Ltd.) was added to each coating solution, and further dispersed for 4 hours.

Samples 6 to 10:

Samples 6 to 10 were produced in the same manner as in the preparation of sample 4 except that the amount of isocetyl stearate in the magnetic coating solution or the nonmagnetic coating solution was changed or the kind and amount of isocetyl stearate in the magnetic coating solution and the nonmagnetic coating solution were changed to the ester and the amount as shown in Table 1.

Samples 11 and 12:

Samples 11 and 12 were produced in the same manner as in the preparation of sample 1 except that the amount of isocyanate added to magnetic coating solution A or the nonmagnetic coating solution was changed to the amount shown in Table 1.

Samples 13 to 15:

Samples 13 to 15 were produced in the same manner as in the preparation of sample 4 except that the amount of isocyanate added to the magnetic coating solution or the nonmagnetic coating solution was changed to the amount shown in Table 1.

Samples 16 and 17:

Samples 16 and 17 were produced in the same manner as in the preparation of sample 1 except that the average particle size of diamond particles added to magnetic coating solution A was changed to the average particle size as shown in Table 1.

Sample 18:

Sample 18 was produced in the same manner as in the preparation of sample 1 except that that magnetic coating solution C shown below was used in place of magnetic coating solution A, each composition was blended in a kneader, dispersed with a sandmill at 2,000 rpm for 12 hours, and a solution obtained by slurrying polyisocyanate and 2 parts of diamond particles having an average particle size of 150 nm in cyclohexanone and subjecting the slurry to ultrasonic treatment was added to the above dispersion.

| Magnetic coating solution A: | |
|---|---|
| Hexagonal barium ferrite | 100 parts |
| Surface covering compounds: $Al_2O_3$ 5 mass %, | |
| $SiO_2$ 2 mass % | |
| Hc: 2,500 Oe (200 kA/m) | |
| Tabular diameter: 30 nm | |
| Tabular ratio: 3 | |
| σs: 56 A · $m^2$/kg | |
| Vinyl chloride copolymer | 6 parts |
| MR110 (manufactured by Nippon Zeon Co., Ltd.) | |
| Polyurethane resin | 3 parts |
| UR8200 (manufactured by Toyobo Co., Ltd.) | |
| Diamond particles | 2 parts |
| (average particle size: 150 nm) | |
| Carbon black | 1 part |
| #50 (manufactured by Asahi carbon Co., Ltd.) | |
| Isocetyl stearate | 4 parts |
| Stearic acid | 1 part |
| Oleic acid | 1 part |
| Methyl ethyl ketone | 80 parts |
| Cyclohexanone | 120 parts |
| Magnetic coating solution B: | |
| Hexagonal barium ferrite | 100 parts |
| Surface covering compounds: $Al_2O_3$ 5 mass %, | |
| $SiO_2$ 2 mass % | |
| Hc: 2,500 Oe (200 kA/m) | |
| Tabular diameter: 30 nm | |
| Tabular ratio: 3 | |
| σs: 56 A · $m^2$/kg | |
| Vinyl chloride copolymer | 6 parts |
| MR110 (manufactured by Nippon Zeon Co., Ltd.) | |
| Polyurethane resin | 3 parts |
| UR8200 (manufactured by Toyobo Co., Ltd.) | |
| Diamond particles | 2 parts |
| (average particle size: 150 nm) | |
| Isocetyl stearate | 5 parts |
| Stearic acid | 1 part |
| Oleic acid | 1 part |
| Methyl ethyl ketone | 80 parts |
| Cyclohexanone | 120 parts |
| Magnetic coating solution C: | |
| Hexagonal barium ferrite | 100 parts |
| Surface covering compounds: $Al_2O_3$ 5 mass %, | |
| $SiO_2$ 2 mass % | |
| Hc: 2,500 Oe (200 kA/m) | |
| Tabular diameter: 30 nm | |
| Tabular ratio: 3 | |
| σs: 56 A · $m^2$/kg | |
| Vinyl chloride copolymer | 6 parts |
| MR110 (manufactured by Nippon Zeon Co., Ltd.) | |
| Polyurethane resin | 3 parts |
| UR8200 (manufactured by Toyobo Co., Ltd.) | |
| Carbon black | 1 part |
| #50 (manufactured by Asahi carbon Co., Ltd.) | |
| Isocetyl stearate | 5 parts |
| Stearic acid | 1 part |
| Oleic acid | 1 part |
| Methyl ethyl ketone | 80 parts |
| Cyclohexanone | 120 parts |
| Nonmagnetic coating solution: | |
| α-$Fe_2O_3$ hematite | 100 parts |
| Average long axis length: 0.07 μm | |
| Average short axis length: 0.014 μm | |
| $S_{BET}$: 55 $m^2$/g | |
| pH: 9 | |
| Surface covering compounds: $Al_2O_3$ 8 mass % | |
| Carbon black | 25 parts |
| Conductex SC-U (average particle Size: | |
| 20 nm, manufactured by Columbia Carbon | |
| Co., Ltd.) | |
| Vinyl chloride copolymer | 15 parts |
| MR104 (manufactured by Nippon Zeon Co., Ltd.) | |
| Polyurethane resin | 7 parts |
| (polyurethane comprising neopentyl glycol/ | |
| hydroxycaproic acid/phthalic acid/sodium salt | |
| of bis (2-hydroxyethyl) sulfoisophthalate/ | |
| diphenylmethanediisocyanate, mass average | |
| molecular weight: 40,000, Tg: 38° C., containg | |
| 6.5 × $10^{-5}$ eq/g of sodium sulfonate) | |
| Phenylphosphonic acid | 4 parts |
| Isocetyl stearate | 6 parts |
| Oleic acid | 1.3 parts |
| Stearic acid | 1.3 parts |
| Methyl ethyl ketone/cyclohexanone | 250 parts |
| (8/2 mixed solvent) | |

Measurement of SNR:

SNR was measured with model RWA1001 disc-evaluating apparatus (manufactured by Guzik Technical Enterprises, U.S.A.) and Spin Stand LS-90 (manufactured by Kyodo Denshi System Co., Ltd.). A signal of linear recording density of 100 KFCI was written with complex MR head consisting of write track breadth of 1.5 μm and read track breadth of 0.9 μm at an engine speed of 3,600 rpm and the position of radius 44 mm. SNR value of the outermost periphery was obtained from the reproduction output (TAA) and the noise level after DC erasure, and the value obtained by measurement in the same manner as above at the position of radius 22 mm was taken as SNR value of the innermost periphery.

Measurement of Friction:

Friction was measured with RWA1001 disc-evaluating apparatus (manufactured by Guzik Technical Enterprises U.S.A.) and Spin Stand LS-90 (manufactured by Kyodo Denshi System Co., Ltd.) carrying the complex MR head used in the measurement of SNR connected to a load cell (LVS-10GA, manufactured by Kyowa Electronic Instruments Co., Ltd., Japan). Frictional forces measured at an engine speed of 3,600 rpm and the positions of radius 22 mm and radius 44 mm were respectively taken as Fin and Fout.

Measurement of Durability:

Durability was measured with RWA1001 disc-evaluating apparatus (manufactured by Guzik Technical Enterprises U.S.A.) and Spin Stand LS-90 (manufactured by Kyodo Denshi System Co., Ltd.) using the complex MR head used in the measurement of SNR. The positions from radius 22 mm to radius 44 mm were continuously sought at an engine speed of 3,600 rpm. After starting seeking, dropout in the sought area was measured every 10 hours, and the time when a defect of the length of 300 μm or more where dropout lowered 30% or more was confirmed was taken as the lifetime of that medium.

TABLE 1

| Sample No. | Remarks | Diamond Kind | Average Particle Size (nm) | Fatty Acid Ester Kind | Fatty Acid Ester Amt. (pts.) | Polyisocyanate Amt. (pts.) | Fatty Acid Ester Kind | Fatty Acid Ester Amt. (pts.) | Polyisocyanate Amt. (pts.) |
|---|---|---|---|---|---|---|---|---|---|
| 1 | Comp. | A | 150 | Isocetyl stearate | 4 | 3 | Isocetyl stearate | 6 | 6 |
| 2 | Comp. | A | 150 | Isocetyl stearate | 6 | 3 | Isocetyl stearate | 8 | 6 |
| 3 | Comp. | A | 150 | Isocetyl stearate | 8 | 3 | Isocetyl stearate | 10 | 6 |
| 4 | Ex. | B | 150 | Isocetyl stearate | 4 | 3 | Isocetyl stearate | 6 | 6 |
| 5 | Ex. | B | 150 | Isocetyl stearate | 4 | 3 | Isocetyl stearate | 6 | 6 |
| 6 | Comp. | B | 150 | Isocetyl stearate | 2 | 3 | Isocetyl stearate | 4 | 6 |
| 7 | Ex. | B | 150 | Isocetyl stearate | 6 | 3 | Isocetyl stearate | 8 | 6 |
| 8 | Comp. | B | 150 | Isocetyl stearate | 8 | 3 | Isocetyl stearate | 10 | 6 |
| 9 | Ex. | B | 150 | n-Butyl stearate | 6 | 3 | n-Butyl stearate | 8 | 6 |
| 10 | Ex. | B | 150 | n-Butyl stearate | 8 | 3 | n-Butyl stearate | 10 | 6 |
| 11 | Comp. | A | 150 | Isocetyl stearate | 4 | 5 | Isocetyl stearate | 6 | 10 |
| 12 | Comp. | A | 150 | Isocetyl stearate | 4 | 8 | Isocetyl stearate | 6 | 16 |
| 13 | Comp. | B | 150 | Isocetyl stearate | 4 | 1 | Isocetyl stearate | 6 | 2 |
| 14 | Ex. | B | 150 | Isocetyl stearate | 4 | 5 | Isocetyl stearate | 6 | 10 |
| 15 | Ex. | B | 150 | Isocetyl stearate | 4 | 8 | Isocetyl stearate | 6 | 16 |
| 16 | Ex. | A | 180 | Isocetyl stearate | 4 | 3 | Isocetyl stearate | 6 | 6 |
| 17 | Ex. | A | 200 | Isocetyl stearate | 4 | 3 | Isocetyl stearate | 6 | 6 |
| 18 | Ex. | C | 150 | Isocetyl stearate | 4 | 3 | Isocetyl stearate | 6 | 6 |

| Sample No. | Remarks | Fin (mN) | Font (mN) | Fin/Fout | SNR Innermost Periphery (dB) | SNR Outermost Periphery (dB) | Duration of Life (hr) |
|---|---|---|---|---|---|---|---|
| 1 | Comp. | 40 | 20 | 2.0 | 22 | 20 | 300 |
| 2 | Comp. | 50 | 15 | 3.3 | 22 | 18 | 100 |
| 3 | Comp. | 60 | 10 | 6.0 | 22 | 14 | 20 |
| 4 | Ex. | 20 | 10 | 2.0 | 22 | 22 | 1,000< |
| 5 | Ex. | 15 | 5 | 3.0 | 22 | 20 | 1,000< |
| 6 | Comp. | 30 | 25 | 1.2 | 22 | 22 | 50 |
| 7 | Ex. | 25 | 10 | 2.5 | 22 | 22 | 1,000< |
| 8 | Comp. | 45 | 5 | 9.0 | 22 | 12 | 300 |
| 9 | Ex. | 25 | 20 | 1.3 | 22 | 22 | 1,000< |
| 10 | Ex. | 30 | 10 | 3.0 | 22 | 20 | 1,000< |
| 11 | Comp. | 40 | 15 | 2.7 | 22 | 20 | 500 |
| 12 | Comp. | 40 | 10 | 4.0 | 22 | 19 | 500 |
| 13 | Comp. | 35 | 25 | 1.4 | 22 | 22 | 100 |
| 14 | Ex. | 25 | 10 | 2.5 | 22 | 20 | 1,000< |
| 15 | Ex. | 20 | 5 | 4.0 | 22 | 19 | 1,000< |
| 16 | Ex. | 30 | 20 | 1.5 | 22 | 22 | 1,000< |
| 17 | Ex. | 25 | 15 | 1.7 | 22 | 21 | 1,000< |
| 18 | Ex. | 20 | 15 | 1.3 | 22 | 22 | 1,000< |

As can be apparent from the results shown in Table 1, by restricting frictional force (Fin), frictional force (Fout) and Fin/Fout to specific ranges, long duration of life can be obtained in the samples according to the present invention, and high SNR can be ensured in both of the innermost periphery and the outermost periphery even with a track breadth as high as 1.5 μm. On the other hand, comparative samples cannot reconcile SNR with durability.

This application is based on Japanese Patent application JP2003-274091, filed Jul. 14, 2003, the entire content of which is hereby incorporated by reference, the same as if set forth at length.

What is claimed is:

1. A magnetic recording and reproduction method comprising recording or reproducing a track of a rotating flexible magnetic disk by means of a magnetic head, wherein
the flexible magnetic disk comprises a support and a magnetic layer containing ferromagnetic powder and a binder;
the track has a breadth of 2 µm or less; and
a frictional force between the magnetic layer and the magnetic head at innermost peripheral area of a recording region of the flexible magnetic disk is 30 mN or less, a frictional force between the magnetic layer and the magnetic head at outermost peripheral area of a recording region of the flexible magnetic disk is 20 mN or less, and a ratio of the frictional force at the innermost peripheral area to the frictional force at the outermost peripheral area is from 1.3 to 4.0.

2. The method according to claim 1, wherein the frictional force at the innermost peripheral area is 20 mN or less, the frictional force at the outermost peripheral area is 10 mN or less, and the ratio of the frictional force at the innermost peripheral area to the frictional force at the outermost peripheral area is from 1.3 to 2.0.

3. The method according to claim 1, wherein the ferromagnetic powder is hexagonal ferrite powder.

4. The method according to claim 1, wherein the magnetic head is an anisotropic magnetoresistive head.

5. The method according to claim 1, wherein the flexible magnetic disk rotates at 1,800 rpm or more.

6. The method according to claim 1, wherein the flexible magnetic disk rotates at 7,800 rpm or less.

7. The method according to claim 1, wherein the flexible magnetic disk further comprises a lower layer so that the support, the lower layer and the magnetic layer are in this order, wherein the lower layer contains nonmagnetic powder and a binder.

8. The method according to claim 1, wherein the flexible magnetic disk comprises two magnetic layers, so that one of the two magnetic layers, the support, and other of the two magnetic layers are in this order.

9. The method according to claim 1, wherein the magnetic layer contains a higher fatty acid ester and a long chain fatty acid.

10. The method according to claim 1, wherein the magnetic layer further contains diamond particles as an abrasive.

* * * * *